June 30, 1964

JEAN-PAUL J. GRAVEL 3,139,579

SELF-BALANCING SIMULATED BRIDGE CIRCUIT
FOR MEASURING IMPEDANCE

Filed Oct. 27, 1959

INVENTOR.
JEAN-PAUL J. GRAVEL.
BY
A. M. Fernandez
ATTORNEY.

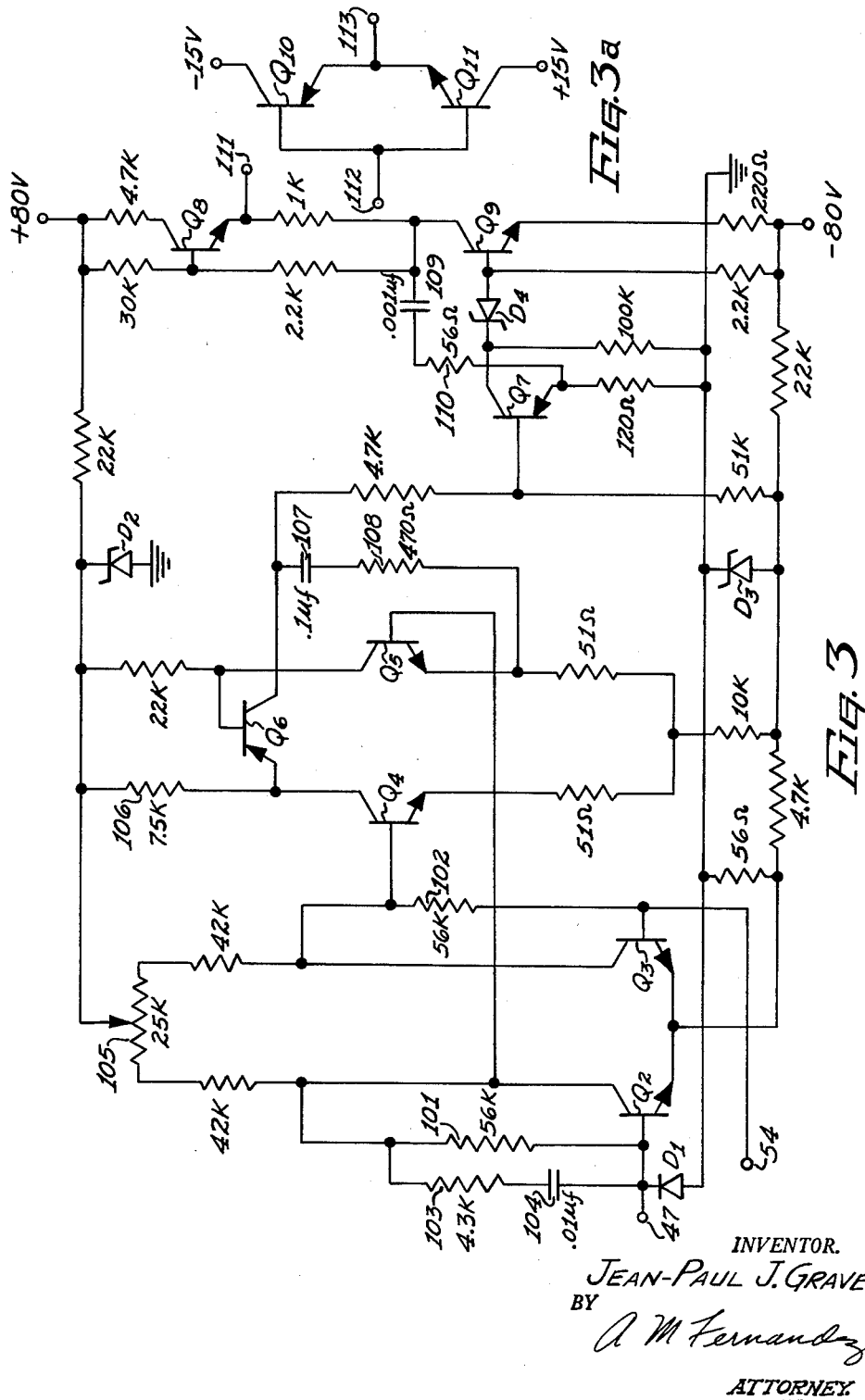

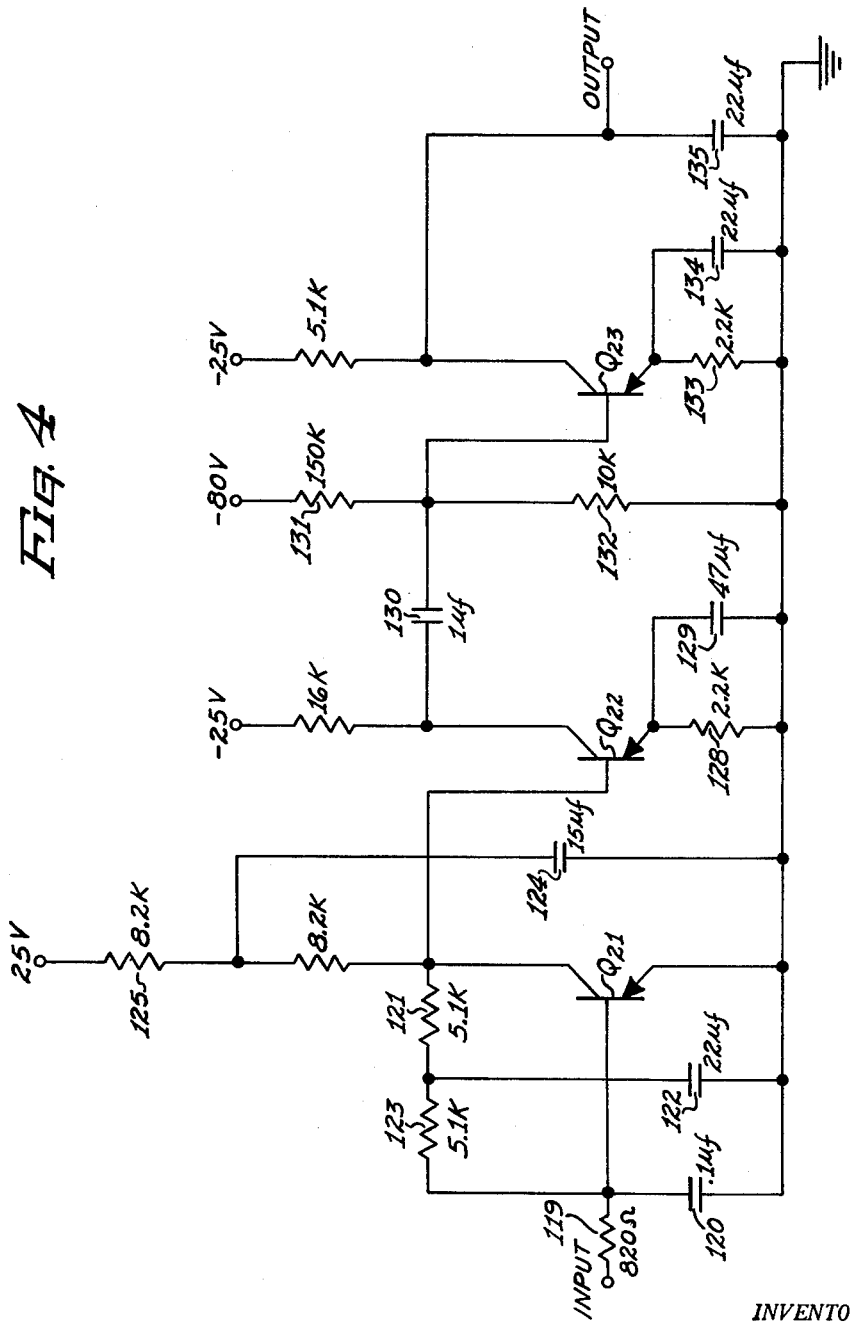

United States Patent Office 3,139,579
Patented June 30, 1964

3,139,579
SELF-BALANCING SIMULATED BRIDGE CIRCUIT FOR MEASURING IMPEDANCE
Jean-Paul J. Gravel, Westwood, Mass., assignor to General Electric Company, a corporation of New York
Filed Oct. 27, 1959, Ser. No. 848,973
14 Claims. (Cl. 324—57)

This invention pertains to an impedance measuring device and particularly to a high-speed, self-balancing, simulated bridge circuit for measuring the impedance of an element, either by itself or in a complex circuit.

Most bridge circuits for measuring impedances are modifications or adaptations of the standard Wheatstone or four-arm bridge. To balance the potential across the bridge proper so that no current flows through it, adjustments are usually made on two of the elements so selected that the adjustment of each is independent. If the adjustments are known, or can be determined, the unknown impedance can then be calculated from the known standard impedance and the two known adjusted elements.

In the past, electromechanical servo techniques have been employed to provide self-balancing bridge circuits, but the maximum speed with which a given bridge circuit may be balanced by using electromechanical servo techniques is inherently limited to the speed of the servomechanism employed. Since servomechanisms are relatively slow, those self-balancing bridge circuits are relatively slow and generally unsatisfactory for use in measuring the impedance of elements on a production-line basis.

Accordingly, it is the principal object of this invention to provide a high-speed, self-balancing, circuit for measuring the impedance of an element, either by itself or in a circuit.

Another object of this invention is to provide an improved impedance measuring device in which the effects of undesired current paths connected to an impedance element being measured may be eliminated so that the element need not be disconnected from its complex circuit while its impedance is being measured.

Another object is to provide an impedance measuring device the accuracy of which may be readily increased to a very high degree.

The objects of this invention may be realized in one embodiment by providing a means for connecting an unknown impedance element to a standard impedance element in a series circuit between a first voltage source of one polarity and a second voltage source of the other polarity, and further providing a feedback circuit from the junction between the standard element and the unknown element to the second voltage source. The feedback circuit consists of a direct-coupled summing amplifier and a direct-coupled integrating amplifier connected in cascade from the junction between the standard element and the unknown element to a means comprising an active element for inverting a voltage signal from the integrating amplifier and for algebraically adding it to the voltage of the second source. If the impedance of the unknown element equals the impedance of the known element, the junction between the two elements remains at substantially ground potential when the series circuit is connected to the voltage sources. If not, an error voltage developed at the junction is detected, amplified, integrated and applied to the standard element by adding it to the voltage of the second source to balance the current through the standard element with the current through the unknown element such that the junction between them is returned to substantially ground potential. The voltage signal output of the integrating amplifier is a measurement of the unknown impedance. A voltmeter connected to the output terminal of the integrating amplifier may be calibrated to present either the percent of error by which the unknown differs from the standard or to present the impedance of the unknown directly. If the unknown element being measured is part of a complex electronic circuit, each element of that complex circuit having one terminal connected to the unknown element may provide a "sneak circuit" while the measurement is being made. A sneak circuit is a bypass for part of the current through the unknown element. To eliminate sneak circuit effects, the junctions on the other side of those elements whose sneak circuits affect the element being measured are connected to ground or a point of reference potential.

Other objects and advantages will become apparent from the following description with reference to the accompanying drawings in which:

FIG. 3 is a circuit diagram of a direct-coupled amplifier which may be used to implement the operational amplifier of FIG. 2; FIG. 3a is a power output stage for the amplifier of FIG. 3; and FIG. 4 is a circuit diagram of an alternating-current amplifier which may be used to implement the operational amplifier of FIG. 3.

Figure 1:
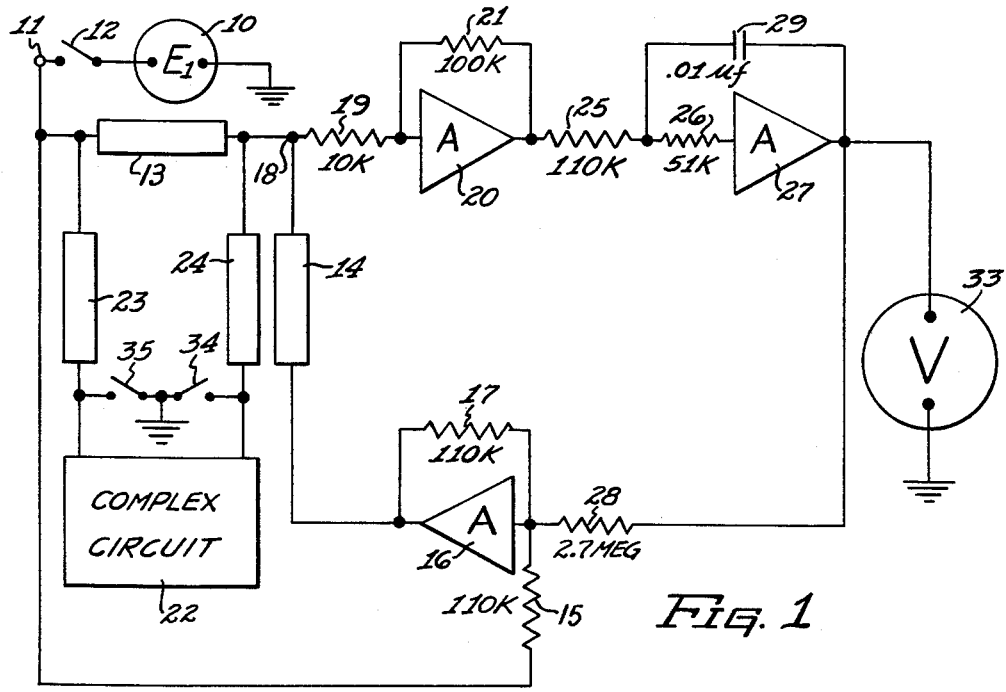
FIG. 1 is a schematic diagram of the invention.

Referring to FIG. 1, a test voltage source 10 is connected to an input terminal 11 by a switch 12. One terminal of an impedance element 13, the impedance of which is to be measured, is directly connected to the input terminal 11. The other terminal of element 13 is directly connected to one terminal of a standard impedance element 14, the impedance of which is known. The other terminal of the standard element 14 is connected to the input terminal 11 by a coupling resistor 15 and a high-gain, low-drift, amplifier 16 having a feedback resistor 17 which is matched with the coupling resistor 15 so that the amplifier 16 functions only as an inverter for the test voltage coupled to the element 14 from the source 10.

A junction 18 between the element 13 and the standard element 14 is directly connected by a coupling resistor 19 to a second high-gain, low drift, amplifier 20 having a feedback resistor 21. The ratio of feedback resistance to input resistance is designed to provide a ratio of output voltage to input voltage for the amplifier 20 that, in the present embodiment, is equal to ten. However, that ratio may be varied for a number of different design considerations.

It is to be assumed that the impedance element 13 is connected to a complex electronic circuit 22 by impedance elements 23 and 24 and that for a variety of reasons the element 13 is not to be disconnected from the circuit 22 while its impedance is being measured. But for the present, consider the element 13 as being disconnected from the elements 23 and 24.

The junction 18 is normally maintained at substantially ground potential by a feedback loop from the output terminal of the amplifier 20 to the input terminal of the amplifier 16. That loop consists of two coupling resistors 25 and 26 coupling a high-gain, low-drift, amplifier 27 to the output terminal of the amplifier 20 and a coupling resistor 28 connecting the output terminal of the amplifier 27 to the input terminal of the amplifier 16. The amplifier 27 includes a feedback capacitor 29 connecting the output terminal of the amplifier 27 to its input terminal through the coupling resistor 26. Accordingly, the amplifier 27, together with its negative feedback circuit, functions as an integrating circuit.

If the junction 18 were not at substantially ground potential, current would flow through the resistor 19 to drive the output terminal of the amplifier 20 to some potential. Assume that potential to be positive in polarity. The output signal of the amplifier 20 is inverted and applied as a negative signal to the input terminal of the amplifier 16, which inverts the integrated signal and adds it to the element 14 to drive the junction 18 toward ground potential. The loop would continue to operate as described until the junction 18 is again at substantially ground potential. In that manner, the circuit is balanced through an active element comprising the amplifier 16, the feedback resistor 17 and the summing resistors 15 and 28.

A voltmeter 33 connected to the output terminal of the integrating amplifier 27 is adjusted to read zero while the circuit is in the balanced condition. If the circuit is balanced, all of the input and output terminals of the operational amplifiers are virtually at zero potential because there is no other potential being introduced into the closed loop through those amplifiers. Any deviation from zero or ground potential can only be due to drift in the amplifier circuits. Accordingly, the amplifiers are designed to have virtually no drift.

If the switch 12 is now closed, a test voltage $E_1$ from the source 10 is applied to the element 13 and to the coupling resistor 15. The output terminal of the amplifier 16 is then driven to a $-E_1$ potential. The elements 13 and 14 constitute a voltage dividing network between $+E_1$ and $-E_1$. If the impedances of the elements 13 and 14 are equal, the potential at the junction 18 will remain virtually at zero or ground potential and the voltmeter will continue to indicate zero volts.

If the impedance elements are not equal, the junction 18 will be driven to some potential in the first instance. However, the balancing loop will return the junction to ground potential in the manner described hereinbefore. The voltage at the output terminal of the integrating amplifier necessary to balance the circuit is then a measurement of the percent of error between the unknown element 13 and the standard element 14, and the polarity of the voltage output is an indication of the direction of the error.

For instance, assume that the unknown element 13 is larger than the standard element 14. Upon closing the switch 12, the junction 18 is driven in the negative direction in the first instance and current flows toward the junction 18 through the resistor 19 since the junction is negative with respect to the input terminal of the amplifier 20 which is maintained at virtual ground by the feedback resistor 21. The increased current through the feedback resistor 21 away from the output terminal of the amplifier 20 drives that output terminal to a positive potential. In order to obtain a better voltage reading from the meter 33 and faster circuit balancing, the resistors 19 and 21 are designed to introduce a multiplication factor of ten as noted hereinbefore.

The output signal of the amplifier 20 is integrated by the next stage of the loop which includes the direct-coupled amplifier 27. The negative output signal of the latter is algebraically added to the signal from the source 10 to provide a less negative voltage to the standard element 14. In that manner, the loop of operational amplifiers balances the circuit by returning the junction 18 to virtual ground.

If the impedance of the element 13 is less than the impedance of the standard element 14, the junction 18 is first driven to a positive potential upon closing the switch 12 and then returned to virtual ground by a positive signal applied to the amplifier 16 from the amplifier 27.

Since the voltmeter 33 will indicate not only the percent of error but also the direction of the error, the impedance of the element 13 may be determined. If desired, the voltmeter 33 may be calibrated to indicate the impedance of the element 13 as well as the percent of error. Alternatively, a threshold device may be used in place of the voltmeter if the element 13 is to be measured only to determine that its impedance is within a particular percent of error. If the impedance of the element is in error by a greater amount than is defined by the threshold voltage of such a device, an output signal will be transmitted by the device which may be used to sound an alarm. Thus, this novel high-speed, self-balancing, circuit may be used for rapid component testing on a production-line basis.

As noted hereinbefore, it is not necessary to remove the element 13 from any complex electrical circuit to which it may be connected in order to measure its impedance as described. However, the effects of sneak circuits must be removed and, if necessary, the elements in the sneak circuits must be protected so that the test voltage $E_1$ will not damage them.

For instance, the elements 23 and 24 which connect the element 13 to the complex circuit 22 may constitute a sneak circuit or parallel current path which will bypass some of the current between the input terminal 11 and the junction 18. If current should flow through the element 24, an erroneous signal amplitude will be required at the output terminal of the amplifier 27 in order to balance the circuit and return the junction 18 to virtual ground. In effect, the sneak circuits reduce the impedance of the elements being measured so that if the impedance of the element 13 is greater than that of the standard element 14, the signal output of the amplifier 27 necessary to balance the circuit is less in amplitude than it should be. Similarly, if the impedance of the element 13 is smaller than that of the standard, the signal output of the amplifier 27 necessary to balance the circuit is greater in amplitude than it should be.

To eliminate the sneak circuit effects, it is only necessary to ground every element of the complex circuit connected to the junction 18 that constitutes part of a sneak circuit. Accordingly, the element 24 is grounded by some means such as a switch 34.

Since the loop of operational amplifiers balances the circuit by returning and holding the junction 18 at virtual ground potential, both terminals of the element 24 are virtually at the same potential, namely ground, when the circuit is in the balanced condition. Accordingly, current does not flow through the element 24 to upset or modify the circuit balance.

For simplicity only one sneak circuit element connected to the junction 18 has been illustrated. Others that may be present should be similarly connected to ground.

The sneak circuit element 23 connected to the input terminal 11 can not affect the impedance measurement of the element 13 if the sneak circuit elements connected to the junction 18 are grounded because it can not make any contribution to the current through the junction 18. However, it may still be desirable to ground it in some way, such as by closing a switch 35, if there is some danger that any current through it may damage some component in the complex circuit 22. On the other hand, grounding the element 23 may cause so much current to flow through it that it may itself be damaged. In that event, some other junction or junctions in the complex circuit must be grounded. The operator of this novel impedance measuring circuit must use his own judgment in determining which junctions in a given complex circuit 12 connected to the input terminal 11 should be grounded. For instance, if there is a junction which should be grounded in order to protect a component, but there is an intermediate component which would be damaged by heavy current, the junction may be grounded and the intermediate component may still be protected by shunting it while the measurement is made.

The test voltage $E_1$ may be from a direct or alternating current source and the element 13 may be a resistor or some element having both real and imaginary impedance. If the impedance of the element 13 is pure resistance, either an A.-C. or D.-C. test voltage may be used and a resistor should be used as the standard element. However, if it is necessary to measure the complex impedance of an element having both real and imaginary impedance, an A.-C. test voltage should be used and a standard element approximately the same as the element to be measured should be selected. For instance, to measure the complex impedance of a coil at a certain frequency, a test voltage source should be used that is alternating at that frequency and the standard impedance element should also be a coil. Of course, to measure the resistance of a coil a D.-C. test voltage source should be used with a standard resistor.

In selecting the standard element for any given test, one should be selected that has approximately the same impedance as the element to be measured. Otherwise, the balancing loop may be overloaded and the measurement may fail.

The amplitude of the test voltage should also be selected with care. For instance, 100 volts would not be used to measure a one ohm resistor and one volt would not be used to measure a 100 ohm resistor. Therefore, the test voltage should be variable. However, it is desirable to maintain a constant scale factor on the balancing loop, i.e., a constant percent of error per volt signal output to the meter. Therefore, if the test voltage is varied, the internal gain of the balancing loop should be correspondingly modified. This may be accomplished by modifying the resistance of the resistor 28. In order to maintain a constant settling time for the self-balancing operation of this circuit, the gain of either the amplifier 20 or 27, or both, should be modified as the resistor 28 is modified. For instance, if the resistance of the resistor 28 is decreased, the gain of the cascaded amplifiers 20 and 27 should also be decreased.

The accuracy of this impedance measuring circuit may be readily increased to detect even a fraction of a percent of error between the element being measured and the standard element by simply increasing the gain or multiplication factor of the balancing loop. That may be accomplished by decreasing the resistance of the coupling resistor 28. Again, it should be noted that as the gain of the loop is increased, the gain or multiplication factor of the amplifiers 20 and 27 should be correspondingly decreased in order to maintain a constant settling time for the self-balancing operation of the circuit.

Any suitable amplifier design may be used for the amplifiers in the schematic diagram of FIG. 1. However, one very good design will now be described.

Figure 2:
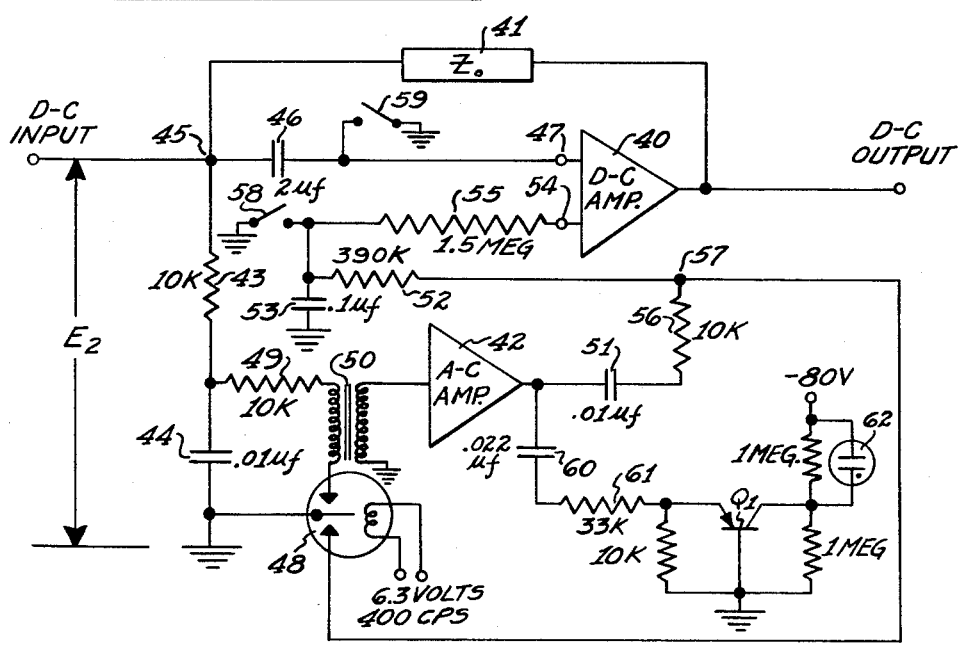
FIG. 2 is a schematic diagram of a modulated-carrier type of stabilized operational amplifier which may be used to implement the invention of FIG. 1.

The operational amplifier illustrated in FIG. 2 consists of a high gain direct-coupled amplifier 40 having a feedback impedance element 41 and a modulated-carrier-type preamplifier 42 or automatic balancing circuit. This type of operational amplifier combines the advantages of a drift-free A.-C. amplifier and the superior high-frequency response of a direct-coupled amplifier to provide increased forward gain at low frequencies as more fully described in Electronic Analog Computers (1952), by G. A. Korn et al., at pages 200 to 210.

A low-pass filter consisting of a resistor 43 and a capacitor 44 shunts the high frequency components of an error voltage signal $E_2$ at a junction 45 so that they are not affected by the automatic balancing circuit. A large D.-C. blocking capacitor 46 couples both the high and the low frequency components of the error signal $E_2$ to a first input terminal 47 of the direct-coupled amplifier. The low frequency components of the error signal $E_2$ which pass the low frequency filter are coupled to an electro-mechanical chopper or synchronous vibrator 48 through an isolating resistor 49 and the primary winding of a transformer 50. The chopped error signal is inductively coupled by the transformer 50, amplified by the A.-C. amplifier 42, rectified by a capacitor 51 in conjunction with the chopper 48, filtered by a resistor 52 and a capacitor 53 and applied to a second input terminal 54 of the direct-coupled amplifier through a large resistor 55. That signal from the A.-C. amplifier channel reduces the effects of drift in the direct-coupled amplifier 40.

Since the A.-C. amplifier is not affected by voltage changes in the power supply, it functions as an input stage to the direct-coupled amplifier having a high-gain and low-drift for the low frequency components of the error signal $E_2$. This arrangement reduces the effects of drift in the direct-coupled amplifier by a factor equal to the gain of the A.-C. amplifier. In operation, any drift in the direct-coupled amplifier is fed back to the junction 45 through an impedance 41 as an error signal which tends to charge the low-pass filter capacitor 44. This drift error signal is then modulated by the chopper 48, amplified and fed to the direct-coupled amplifier 40 through the rectifying capacitor 51, an isolating resistor 56 and the low-frequency filter consisting of the resistor 52 and the capacitor 53.

The junction 57 between the isolating resistor 56 and the low-frequency filter 52 is connected to the chopper 48 to achieve rectification across the capacitor 51. The isolating resistor 56 prevents complete shorting of the A.-C. amplifier output signal when the chopper grounds the junction 57. Otherwise, the chopper contacts may be damaged. A switch 58 is provided to discharge the capacitor 53 to ground potential in order to reset the operational amplifier after an overload condition. A similar switch 59 is also provided to discharge the capacitor 46.

To detect an overload condition, the output signal of the A.-C. amplifier 42 is coupled by a capacitor 60 and a resistor 61 to the emitter of a PNP transistor $Q_1$ to drive a neon diode 62 having a threshold voltage of seventy-five volts. During normal operation, the A.-C. amplifier output does not increase the collector voltage of transistor $Q_1$ sufficiently to fire the neon diode. When the A.-C. amplifier has been driven to saturation, however, the collector of transistor $Q_1$ is driven sufficiently positive to fire the neon diode and indicate the overload condition. After the overload is removed, the diode extinguishes.

The direct-coupled amplifier is a high-gain multiple stage amplifier. It consists of two stages of differential current amplifiers, followed by two single amplifier stages and an output or power amplifier stage as illustrated in FIG. 3.

As noted hereinbefore, there are two input terminals to the direct-coupled amplifier, a terminal 47 capacitively coupled to an error signal source and a terminal 54 directly connected to a modulated-carrier type of preamplifier. The input terminal 47 is directly connected to the base of an NPN transistor $Q_2$. The other input terminal 54 is directly connected to the base of an NPN transistor $Q_3$. Transistors $Q_2$ and $Q_3$ have a common emitter impedance so that together they amplify the net difference of the input signal currents. A diode $D_1$ is provided to shunt possible large negative signals which could otherwise damage the transistor $Q_2$. The collectors of transistors $Q_3$ and $Q_2$ are directly connected to the bases of the respective transistors $Q_4$ and $Q_5$ of a second differential current amplifier.

Resistors 101 and 102 provide negative feedback to control the current gain of the first differential amplifier at lower frequencies. Resistor 103 and capacitor 104 provide negative feedback to control the gain of transistor $Q_2$ at higher frequencies, i.e., to control the roll-off of the first stage. A similar high frequency feedback circuit is not provided for transistor $Q_3$ because it receives only relatively low frequency signals. A potentiometer 105 is provided to balance the first differential amplifier stage.

The collectors of the second differential amplifier transistors $Q_5$ and $Q_4$ are directly connected to the base and to the emitter, respectively, of a PNP transistor $Q_6$ which is a single amplifier stage having a large amount of emitter degeneration provided by a resistor 106. The collector of transistor $Q_6$ is connected to the emitter of transistor $Q_5$ by a capacitor 107 and a resistor 108 to provide negative feedback around the second and third stages in order to control the roll-off of the second stage.

Zener diodes $D_2$ and $D_3$ provide regulation of the +8 and −8 volts required by the first three stages.

The collector of transistor $Q_6$ is also connected to the base of a transistor $Q_7$ in the fourth amplifier stage. The collector of transistor $Q_7$ is coupled through a Zener diode $D_4$ to a fifth stage, an output amplifier which consists of two NPN power transistors $Q_8$ and $Q_9$ arranged to achieve the desired output range with the available power supply voltages. A capacitor 109 and a resistor 110 provide negative feedback around the fourth and fifth stages to control the roll-off of the fourth stage. An output terminal 111 is connected to the emitter of transistor $Q_8$.

FIG. 3a is an additional power amplifier to be connected to the integrator amplifier 17, FIG. 1. It consists of two direct-coupled complementary type transistors $Q_{10}$ and $Q_{11}$. The signal at the output terminal 111, FIG. 3, is received at an input terminal 112 which is directly connected between the base and collector of each transistor. Each transistor produces a current amplification which is relatively independent of the other in a push-pull fashion. An output terminal 113 is directly connected to the emitters of the transistors $Q_{10}$ and $Q_{11}$.

The first stage of the A.-C. amplifier 42, FIG. 2, is a grounded-emitter transistor $Q_{21}$, FIG. 4, connected to an input terminal by a low-pass filter consisting of a resistor 119 and a capacitor 120. Another resistor 121 and capacitor 122 provide roll-off control of the first stage. A negative feedback resistor 123 stabilizes the operating point of the first stage. A capacitor 124 and a resistor 125 form a high frequency decoupling network or filter to avoid picking up noise from the power supply in the first stage.

The collector of the transistor $Q_{21}$ is directly connected to the base of a transistor $Q_{22}$ in the second stage. A resistor 128 provides emitter degeneration and a capacitor 129 lowers the impedance of the second stage at the operating frequency of 400 c.p.s. to obtain maximum gain.

The collector of the transistor $Q_{22}$ is coupled to the base of a transistor $Q_{23}$ in the third stage by a capacitor 130. Resistors 131 and 132 provide proper bias for the third stage which has an emitter degeneration resistor 133 and an impedance lowering capacitor 134. The output signal of the last stage is obtained from the collector of the transistor $Q_{23}$ across a capacitor 135 which filters high frequencies so that the output signal is essentially a 400 c.p.s. modulated signal.

While the principles of the invention have now been made clear in an allustrative emobdiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. An electrical measuring apparatus comprising: first and second impedance elements serially connected between a first source of potential of one polarity and a second source of potential of a second polarity; means connected to a junction between said first and second impedance elements for amplifying a potential thereat; means comprising an active element connected to an output terminal of said amplifying means for inverting a voltage signal therefrom and for algebraically adding the inverted voltage signal to a potential from said second source whereby said junction is maintained at a substantially zero potential; and an indicating means connected to said amplifying means.

2. An electrical measuring apparatus as defined in claim 1 wherein said amplifying means includes a high-gain inverting amplifier coupled to said junction, said amplifier having a negative feedback impedance element comprising a capacitor connecting its output terminal to its input terminal to provide an integrating circuit.

3. An electrical measuring apparatus comprising: a test voltage source; means for connecting said voltage source to a first terminal; first and second impedance elements serially connected between said first terminal and a second terminal; a high-gain inverting amplifier having its input terminal coupled to its output terminal by a negative feedback resistor, said output terminal being connected to said second terminal; a resistor coupling said first terminal to said input terminal of said high-gain amplifier; means connected to a first junction between said first and second impedance elements for amplifying a potential thereat; a resistor coupling said amplifying means to said input terminal of said high-gain amplifier; and indicating means connected to a second junction between said amplifying means and said resistor coupling said amplifying means to said input terminal of said high-gain amplifier.

4. An electrical measuring apparatus as defined in claim 3 including a third impedance element having a certain terminal coupled to said first terminal by a complex circuit and another terminal connected to said first junction; and means for connecting said certain terminal of said third impedance element to a source of reference potential.

5. An apparatus for measuring the electrical impedance of an element comprising: a standard impedance element having a first and second terminal; means for connecting a first test voltage of a given polarity to said first terminal; means for connecting one terminal of an element to be measured to said second terminal of said standard element; means comprising an active element for connecting a second test voltage of a polarity opposite that of said first test voltage to another terminal of said element to be tested; means connected to said second terminal of said standard impedance element for amplifying a voltage thereat; means for inverting a signal output of said amplifying means and for algebraically adding said inverted signal to one of said test voltages; and an indicating means connected to an output terminal of said amplifying means.

6. An apparatus for measuring the electrical impedance of an element as defined in claim 5 wherein said amplifying means includes a first high-gain inverting amplifier having a negative feedback resistor and a second high-gain inverting amplifier having a negative feedback capacitor, said first and second high-gain amplifiers being connected in cascade.

7. An apparatus for measuring the electrical impedance of an element comprising: a standard impedance element having a first and second terminal; means for connecting an impedance element to be measured between said second terminal of said standard element and a third terminal; a high-gain inverting amplifier having an input and output terminal, said output terminal being directly, connected to said first terminal of said standard element and coupled to said input terminal by a negative feedback resistor; means connected to said second terminal of said standard element for amplifying a potential thereat; a resistor coupling an output terminal of said amplifying means to said input terminal of said high-gain amplifier; a source of test voltage; means for connecting said source to said third terminal; a resistor coupling said third terminal, to said input terminal of said high-gain amplifier; and an indicating means connected to said output terminal of said amplifying means.

8. An apparatus for measuring the electrical impedance of an element as defined in claim 7 wherein said amplifying means comprises a first high-gain inverting amplifier having a negative feedback resistor and a second high-gain inverting amplifier having a negative feedback capacitor, an input terminal of said first high-gain amplifier being coupled to said second terminal of said standard element by a resistor and an input terminal of said second high-gain amplifier being connected to an output terminal of said first high-gain amplifier by a resistor.

9. An apparatus for measuring the electrical impedance of an element as defined in claim 7 including means for connecting one terminal of a sneak circuit element to a source of reference potential, said sneak circuit element having said one terminal coupled by a complex circuit to said third terminal to which said element to be measured is connected and having another terminal connected to said second terminal to which said element to be measured is connected.

10. An electrical measuring apparatus comprising: a source of potential; a junction; a first impedance element coupling said source of potential to said junction; amplifying means having an input terminal connected to said junction for amplifying a potential thereat and for transmitting from its output terminal a voltage signal proportional to said junction potential; a second impedance element having a first terminal connected to said junction and a second terminal; summing means comprising an active element having two input terminals and an output terminal for algebraically adding two voltages and for inverting their sum voltage signal; means for connecting the output terminal of said summing means to the second terminal of said second impedance element; means for connecting the output terminal of said amplifying means to one input terminal of said summing means; means for applying a voltage from said source of potential to the other input terminal of said summing means; and an indicating means connected to the output terminal of said amplifying means.

11. An electrical measuring apparatus as defined in claim 10 wherein said summing means comprises: a high-gain inverting amplifier having an input terminal and an output terminal; a negative feedback resistor coupling the output terminal to the input terminal of said high-gain amplifier; means for connecting the output terminal of said high-gain amplifier to the second terminal of said second impedance element; a resistor coupling said one input terminal of said summing means to the input terminal of said high-gain amplifier; and a resistor coupling said other input terminal of said summing means to the input terminal of said high-gain amplifier.

12. An electrical measuring apparatus as defined in claim 11 wherein said means for applying a voltage to said other input terminal of said summing means comprises a connecting means for coupling said other input terminal of said summing means to said first source of potential.

13. An apparatus for measuring the electrical impedance of an unknown element having a first and second terminal comprising: a standard impedance element having a first and second terminal; a junction; means for connecting said first terminal of said unknown element and said first terminal of said standard element to said junction; amplifying means connected to said junction for amplifying a potential thereat; summing means comprising an active element having two input terminals and an output terminal for algebraically adding two voltages and for inverting their sum voltage signal; means for connecting the output terminal of said summing means to the second terminal of one of said elements; means for connecting the output terminal of said amplifying means to one input terminal of said summing means; means for simultaneously connecting a test voltage to the second terminal of the other one of said elements and to the other input terminal of said summing means; and an indicating means connected to the output terminal of said amplifying means.

14. In an apparatus for measuring the electrical impedance of an unknown element, the combination comprising: means for connecting said element in series with a standard element between a first source of test voltage of a given amplitude and polarity and a second source of test voltage of an opposite polarity but of an equal amplitude as said first source whereby said elements form a voltage dividing network to establish a potential at a junction between said standard element and said unknown element, said potential being substantially zero volts if the impedance of said unknown element is equal to the impedance of said standard element; amplifying means connected to said junction for amplifying a potential thereat; an electronic balancing means comprising an active element directly connected between an output terminal of said amplifying means and said second source of test voltage for adjusting the voltage amplitude of said second test voltage in response to an output signal from said amplifying means until said junction is returned to substantially zero volts; and a voltage-sensitive indicating means connected to said output terminal of said amplifying means for providing a measurement of the impedance of the element to be measured.

References Cited in the file of this patent

UNITED STATES PATENTS

| | | |
|---|---|---|
| 2,623,929 | Moody et al. | Dec. 30, 1952 |
| 2,786,169 | Muffly | Mar. 19, 1957 |
| 2,904,753 | Konrad | Sept. 15, 1959 |
| 2,911,829 | Weiss et al. | Nov. 10, 1959 |
| 2,968,180 | Schafer | Jan. 17, 1961 |
| 2,972,106 | Hyrne | Feb. 14, 1961 |